US008641350B2

(12) United States Patent
de Ridder

(10) Patent No.: US 8,641,350 B2
(45) Date of Patent: Feb. 4, 2014

(54) WAFER BOAT ASSEMBLY, LOADING APPARATUS COMPRISING SUCH A WAFER BOAT ASSEMBLY AND METHOD FOR LOADING A VERTICAL FURNACE

(75) Inventor: Chris G. M. de Ridder, Almere (NL)

(73) Assignee: ASM International N.V., Almere (NL)

( * ) Notice: Subject to any disclaimer, the term of this patent is extended or adjusted under 35 U.S.C. 154(b) by 226 days.

(21) Appl. No.: 13/030,781

(22) Filed: Feb. 18, 2011

(65) Prior Publication Data

US 2012/0213613 A1 Aug. 23, 2012

(51) Int. Cl.
*B65G 25/00* (2006.01)

(52) U.S. Cl.
USPC .......................................... 414/160; 414/804

(58) Field of Classification Search
USPC ............... 414/160, 217, 416.03, 941, 416.08, 414/937, 804
See application file for complete search history.

(56) References Cited

U.S. PATENT DOCUMENTS 5,277,579 A * 1/1994 Takanabe .......................... 432/5
5,404,894 A * 4/1995 Shiraiwa ......................... 134/66
5,556,275 A * 9/1996 Sakata et al. .................. 432/241
5,902,103 A * 5/1999 Maeda et al. ................. 432/253
5,968,593 A * 10/1999 Sakamoto et al. ......... 427/248.1
6,663,332 B1 * 12/2003 Sluijk et al. ................... 414/160
6,835,039 B2 * 12/2004 van den Berg et al. ....... 414/217
6,981,832 B2 * 1/2006 Zinger et al. .................. 414/217
2008/0023417 A1 * 1/2008 Yamamoto ................. 211/41.18
2009/0197409 A1 * 8/2009 Morita et al. ................. 438/680

* cited by examiner

*Primary Examiner* — Joshua Rudawitz

(74) *Attorney, Agent, or Firm* — Preti Flaherty Beliveau & Pachios LLP

(57) ABSTRACT

A wafer boat assembly for use with a loading apparatus configured to insert the wafer boat assembly loaded with semiconductor substrates into a furnace. The wafer boat assembly includes a first wafer boat part comprising a base and a first cover part mounted on the base; and a second wafer boat part comprising a second cover part that is provided with receiving slots for holding a plurality of semiconductor substrates. The second cover part has an arcuate shape that extends from a first longitudinal edge to a second longitudinal edge. The first and second wafer boat parts are detachably connectable, such that they mate together to extend around an outer perimeter of a loaded substrate at a predetermined distance.

16 Claims, 4 Drawing Sheets

WAFER BOAT ASSEMBLY, LOADING APPARATUS COMPRISING SUCH A WAFER BOAT ASSEMBLY AND METHOD FOR LOADING A VERTICAL FURNACE

FIELD OF THE INVENTION

The present invention relates to the field of processing of planar thin semiconductor substrates, and more in particular to the loading of semiconductor substrates into a vertical furnace configured for batch processing.

BACKGROUND

It is commonly known that semiconductor substrates may be manufactured by means of processes like depositing thin films on surfaces of silicon wafers. Such processes may be carried out in a vertical furnace. Such a vertical furnace is known and typically comprises a process chamber arranged in said furnace such that a central axis of the process chamber substantially coincides, or at least extends in a substantially similar direction, with a central axis of the vertical furnace. Vertical furnaces usually have a load size of 100-150 wafers that are spaced apart such that during processing of the respective wafers the entire surface of each substrate can be subjected to the process. Before processing wafers in a vertical furnace, the wafers are provided in a loading configuration wherein the wafers are substantially horizontally oriented and are mutually spaced in a vertical direction wherein the centre points of the wafers are approximately positioned on the central axis of the process chamber. The loading configuration may be provided by a wafer boat that is adapted to receive a plurality of wafers. In a number of film deposition processes, the film deposited on the wafers may be relatively thick at an edge region of the wafer. To improve the uniformity in thickness of the film deposited on the wafers, the wafer boat may be covered by a boat cover that substantially surrounds the entire wafer perimeter. The cover comprises a pattern of openings, for instance circular holes or elongated slits, to allow gas to enter the boat such that all wafers to be processed may be fed with a uniform reactive gas stream.

From U.S. Pat. No. 5,556,275 a heat treatment apparatus comprising a boat for holding a plurality of disk-shaped objects such as wafers is known. The wafers are arranged coaxially and spaced at predetermined intervals. The heat treatment apparatus further comprises a hollow cylindrical cover having a plurality of gas ports. The cover may comprise a plurality of parts. For instance, two of the parts may be secured to the boat. To load the wafers into the boat, the wafers have to be inserted through one of the two openings provided between the respective cover parts. The openings between the cover parts mounted to the boat are covered by means of two removable cover members. The first removable cover member preferably has an arcuate cross section and the second removable cover member may comprise a flat plate. To load the boat with wafers, the boat that is provided on a pedestal may be removed from the processing chamber by means of a boat elevator. Wafers may be loaded into the boat by a wafer loading device adjacent the boat elevator. When all wafers have been set into the boat, the removable cover members may be attached to the boat covering the openings between the secured cover parts. After attaching the removable cover members to the boat, the boat is elevated such that is brought into the processing chamber.

From U.S. Pat. No. 5,902,103 a vertical furnace is known for use in a semiconductor manufacturing apparatus which comprises a heater, an outer tube, an inner tube and a boat adapted to be introduced into the inner tube with a wafer loaded thereon. The boat comprises a boat cover disposed permanently internally of the inner tube concentrically therewith. The boat cover comprises a boat cover body having an amount of slit apertures extending in a longitudinal direction thereof. The boat cover further comprises auxiliary cover plates connected to said boat cover body such that the slit apertures are covered thereby providing a gas flow passage between the auxiliary cover plate and the boat cover body. The boat cover may be separable in two semi-cylindrical halves, one of the halves residing in the inner tube permanently. The boat is composed of a ceiling plate, a bottom plate and support posts connecting said plates. The support posts are provided with grooves with a predetermined pitch to retain semiconductor substrates.

The boat cover may thus, at least partially, be mounted within a tube, such as an inner tube of the vertical furnace. To load/unload wafers into/from the boat, the boat provided on a pedestal may be removed from the inner tube of the vertical furnace, via a loading opening in the bottom of said furnace whereas the boat cover remaining inside the inner tube. The boat on the pedestal may be filled with the silicon wafers to be processed and the loaded wafer boat may be inserted in the inner tube of the furnace again, such that the boat is covered by the boat cover in the inner tube. The substrates are then ready for processing.

A disadvantage of this design is that the clearance between wafer edge and cover, required to allow insertion of the wafer boat into the inner tube without scratching the inner tube, would be significantly larger than the clearance that is needed to obtain optimum uniformity of film thickness on the wafer. In an alternative design, covers are mounted manually on the boat. Although this design allows a smaller clearance between wafer edge and cover, the manual handling of cover plates is not compatible with a manufacturing environment. Automation of the cover placement would require complex robot systems that significantly add to the complexity of the entire system.

Due to an increasing demand of thin semiconductor substrates, it is desired to enhance the throughput of substrates to be processed in a vertical furnace and to have a production worthy solution for processing wafers in a cover boat.

Therefore, it is an object of the present invention to provide an improved loading apparatus for loading planar thin semiconductor substrates in a cover boat in a vertical furnace. More in particular an object of the invention is to provide a simple loading apparatus for loading semiconductor substrates in a cover boat in a vertical furnace in a fully automated way wherein a loading time is minimized and wherein a small clearance between wafer edge and cover can be obtained without a risk of scratching of the process chamber wall by the wafer boat during insertion of the wafer boat into the furnace.

SUMMARY OF THE INVENTION

According to one aspect of the invention a wafer boat assembly for use in a loading apparatus for loading semiconductor substrates in a vertical furnace configured for batch processing is provided. Said wafer boat assembly may comprise a wafer boat for holding semiconductor substrates and a cover configured to substantially surround the substrates, at least during processing thereof. The wafer boat assembly may be provided with a first wafer boat part comprising a base and a first cover part mounted thereto, preferably extending at least partially along a base upper perimeter. The wafer boat assembly may comprises a second wafer boat part comprising a second cover part removably provided on the first wafer boat part and configured to cooperate with the first cover part. The second cover part may comprise receiving slots for receiving at least a semiconductor substrate to be processed. Preferably, the receiving slots are provided such that in use the semiconductor substrates are substantially horizontally oriented and substantially vertically spaced apart.

According to another aspect of the invention, a loading apparatus for loading semiconductor substrates in a vertical furnace configured for batch processing is provided. The loading apparatus may contain the above described wafer boat assembly. The loading apparatus may comprise a boat assembly position for assembling and disassembling the wafer boat assembly, i.e. the first and second boat parts.

By using the proposed loading apparatus containing the proposed wafer boat assembly, a small clearance between wafer edge and cover can be realized and loading of the semiconductor substrates may be automated in a relatively simple way resulting in a relatively short period of time necessary for loading the vertical furnace. Automation of the loading process may be enabled by means of the displacement of a relatively small part of the wafer boat assembly. Handling thereof may be relatively easy due to the minimized dimensions and weight of the second wafer boat part. Consequently, by providing the improved loading apparatus a higher throughput of semiconductor substrates to be processed in a vertical furnace may be obtained.

Such advantages may also be reached with a method, according to a further aspect of the invention, for loading semiconductor substrates into a vertical furnace for batch processing using the above described loading apparatus. The method may comprise separating the wafer boat part from the first wafer boat part provided on a boat assembly position. The method may further comprise displacing the second wafer boat part towards a wafer handling device adjacent the boat assembly position such that a wafer receiving opening of said second wafer boat part faces the wafer handling device. Then, at least one, preferably a plurality, semiconductor substrate in the second wafer boat part may be loaded such that the substrate is received in a receiving slot of the second cover part. Subsequently, the second wafer boat part may be displaced towards the first wafer boat part and mounted to the first wafer boat part. Finally, the wafer boat assembly loaded with at least one, preferably a plurality of wafers, may be inserted into the vertical furnace.

The aforementioned and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

It is noted that identical or corresponding elements in the different drawings are indicated with identical or corresponding reference numerals.

DETAILED DESCRIPTION

In FIGS. 1*a*-4*b*, an example of a wafer boat assembly 1 for use in a loading apparatus 20 (see FIGS. 5-6) for loading semiconductor substrates S in a vertical furnace is shown in different positions during the loading operation. The wafer boat assembly 1 is configured to be received in a vertical furnace comprising a substantially cylindrical process chamber. During processing of the semiconductor substrates S, a central axis of said process chamber substantially coincides with a central axis 2 of the wafer boat assembly. The vertical furnace may be configured to apply a thin film, for instance by means of a deposition process, on at least one surface of the semiconductor substrates S.

Figure 1A:
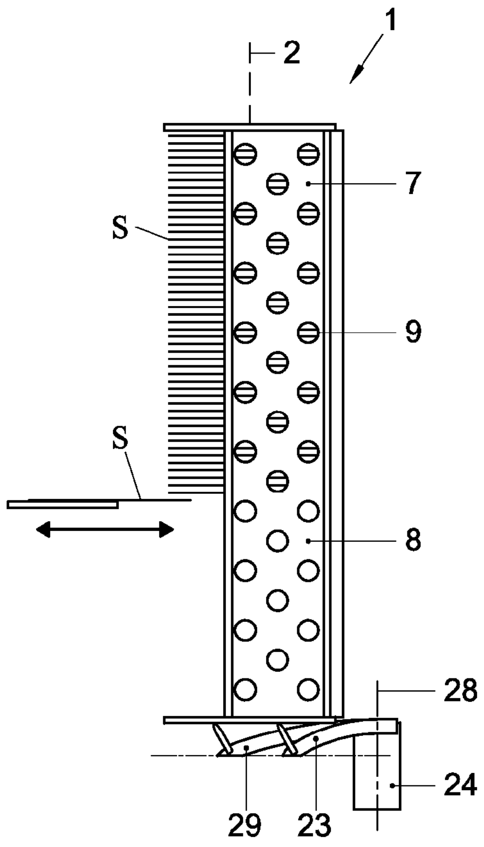
FIG. 1*a* shows a schematic side view of an example of a wafer boat assembly according to the invention in a first position.
Figure 2A:
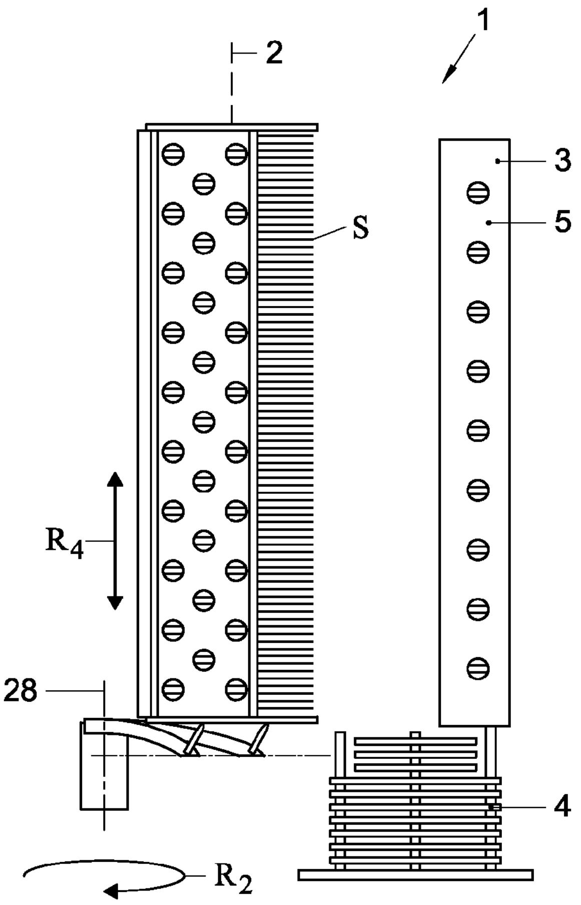
FIG. 2*a* shows a schematic side view of an example of a wafer boat assembly according to the invention in a second position.
Figure 1B:
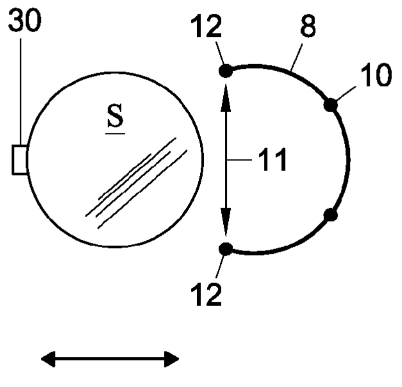
FIG. 1*b* shows a schematic cross sectional view of the wafer boat assembly shown in FIG. 1*a;*
Figure 2B:
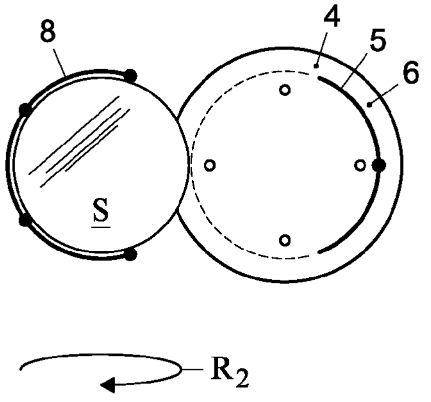
FIG. 2*b* shows a schematic cross sectional view of the wafer boat assembly shown in FIG. 2*a;*
Figure 3A:
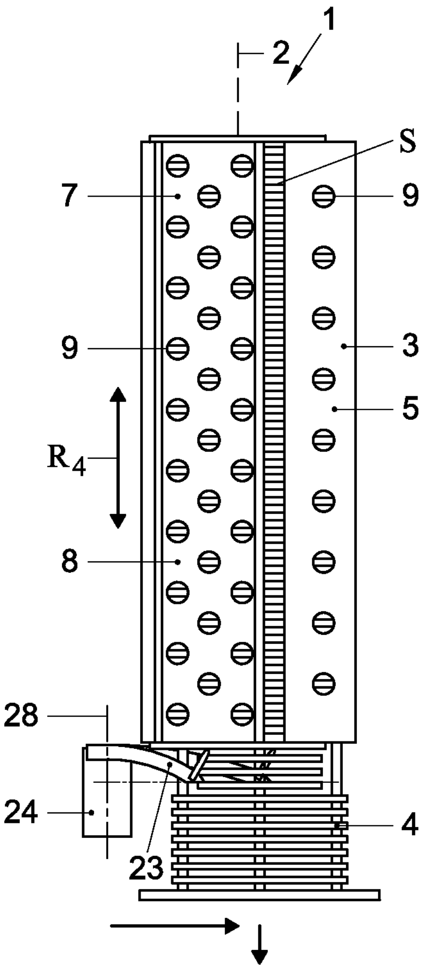
FIG. 3*a* shows a schematic side view of an example of a wafer boat assembly according to the invention in a third position.
Figure 4A:
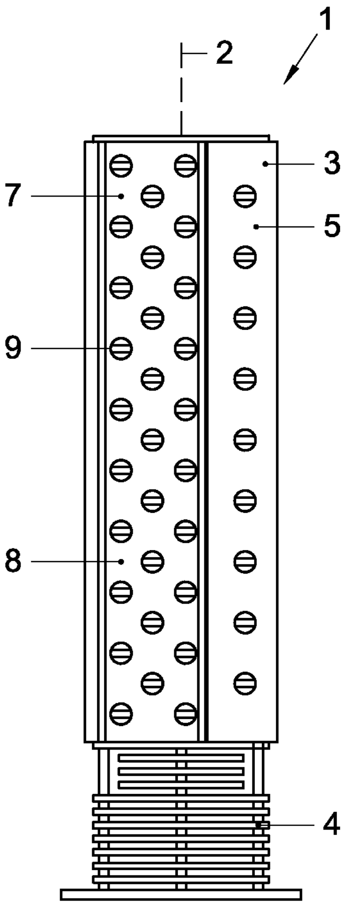
FIG. 4*a* shows a schematic side view of an example of a wafer boat assembly according to the invention in a fourth position.
Figure 3B:
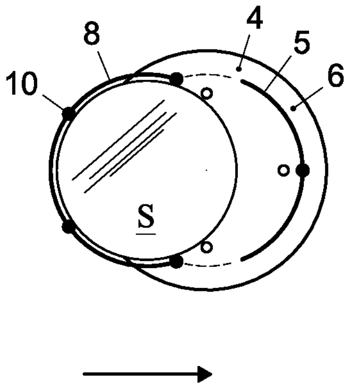
FIG. 3*b* shows a schematic cross sectional view of the wafer boat assembly shown in FIG. 3*a;*
Figure 4B:
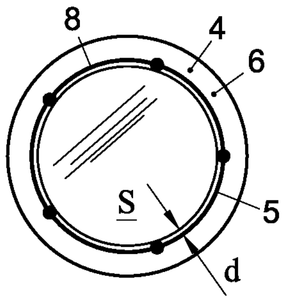
FIG. 4*b* shows a schematic cross sectional view of the wafer boat assembly shown in FIG. 4*a;*

As is visible in FIGS. 2*a*, 3*a* and 4*a*, the wafer boat assembly 1 may comprise a first wafer boat part 3 comprising a base 4, such as a pedestal, and a first cover part 5. The first cover part 5 is mounted to the base 4 and extends at least partially along an upper perimeter 6 of said base 4 as, for instance, is visible in FIG. 2*b*. The base 4 may be configured to cooperate with a receiving opening in a first end of the process chamber, preferably facing a loading position 27 (see FIGS. 5 and 6) of the vertical furnace (not shown). The wafer boat assembly 1 further comprises a second wafer boat part 7 comprising a second cover part 8 that is removably provided on the first wafer boat part 3. Both cover parts 5, 8 are configured to cooperate with each other to substantially surround substrates accommodated in the wafer boat and to create an artificial deposition environment. Therefore, the cover parts 5, 8 are provided with a pattern of openings 9 to allow gas to enter the wafer boat and to provide all semiconductor substrates S inside the wafer boat assembly 1 with a uniform reactive gas stream to enable uniform thin film deposition on at least one semiconductor substrate surface. The design of the pattern of openings 9 may be dependent on the kind of process to be carried out in the vertical furnace, e.g the openings may be circular openings as shown in the drawings or the openings may be elongated slits or the openings may have any other suitable shape, such as square, elliptic etc. The first and second cover parts 5, 8 preferably are provided at a small distance d, for instance of approximately 4-6 mm, or about equal to the mutual wafer spacing of wafer accommodated in the wafer boat, from the outer perimeter P of the semiconductor substrate received in the wafer boat assembly (see FIG. 4*b*).

The second cover part 8 is provided with receiving slots 10 (see FIGS. 1*b*, 2*b*, 3*b* and 4*b*) that are configured for receiving respective semiconductor substrates S to be processed in a substantially horizontal loading configuration and vertically spaced apart. The second cover part 8 has a substantially arc shape and defines an inserting opening 11 in between the two opposing longitudinal edges 12 of said second cover part 8. The inserting opening 11 is substantially larger than a substrate S diameter such that a substrate S may be loaded easily. Due to the relatively small and light weight second cover part 8, loading and unloading of the semiconductor substrates S into the wafer boat assembly may be obtained easily.

Figure 5:
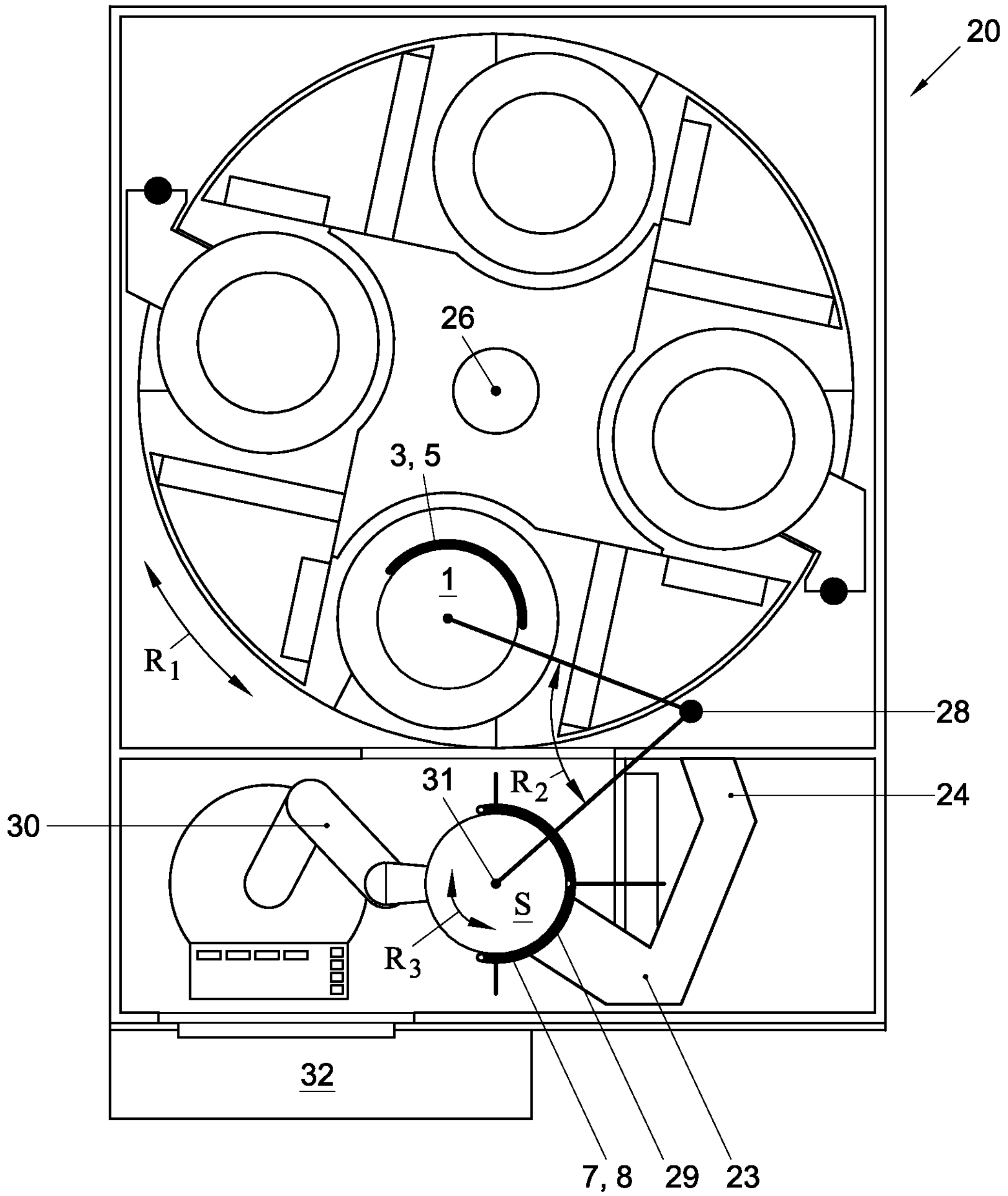
FIG. 5 shows a schematic top view of the loading apparatus according to the invention with part of the wafer boat assembly in a loading position.
Figure 6:
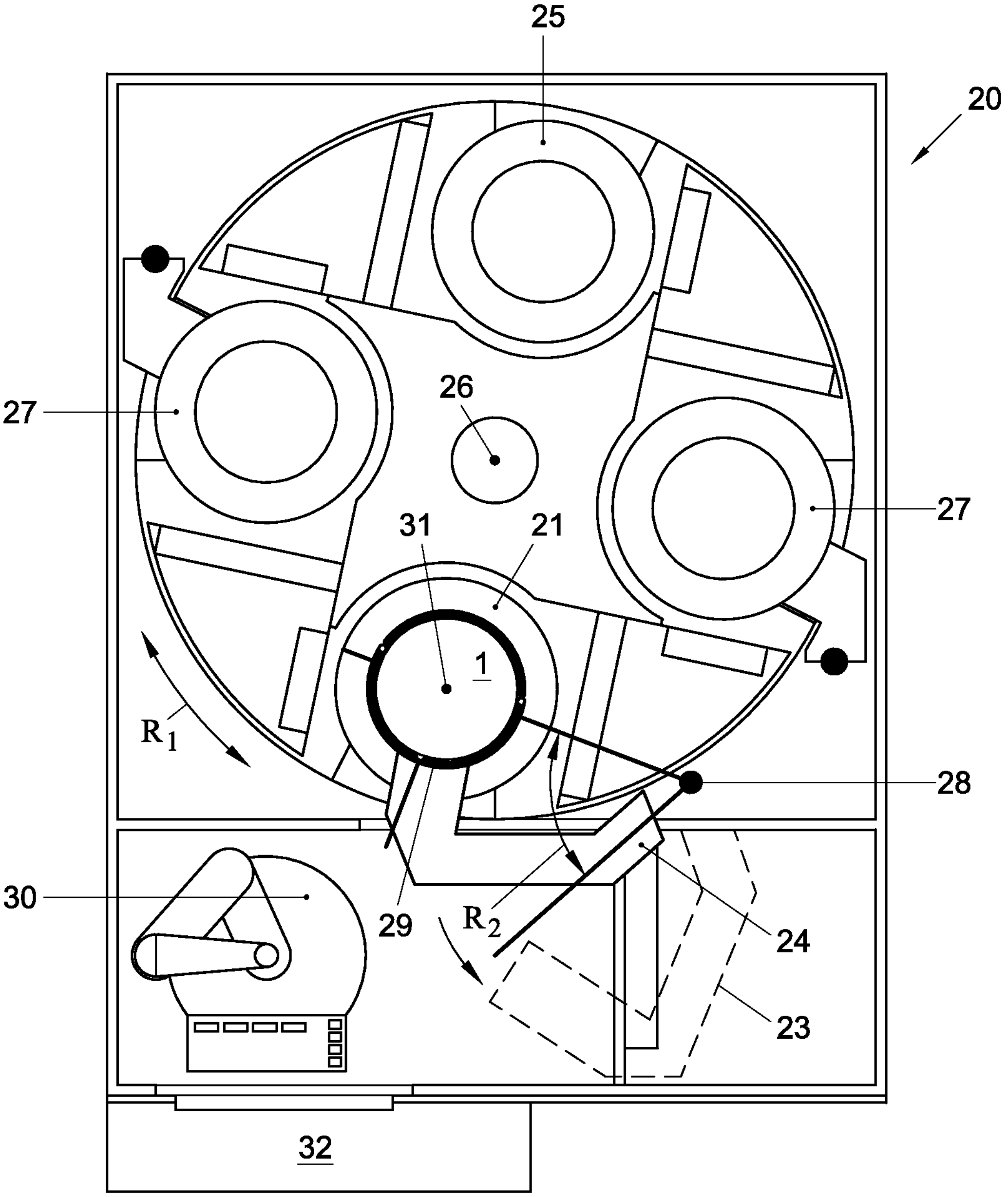
FIG. 6 shows a schematic top view of the loading apparatus according to the invention with a loaded wafer boat assembly ready for processing.

In FIGS. 5 and 6, a loading apparatus 20 according to the invention is shown. The loading apparatus 20 is provided with a loading carousel 22 comprising a boat assembly position 21 for assembling/disassembling the first and second boat parts, two boat loading positions 27 and a boat cool-down position 25. In a region above the loading apparatus 20 one or more process chambers of vertical furnaces (not shown) may be provided, such that the loading positions 27 are positioned below the receiving openings of the process chambers, seen in a substantially vertical direction. The carousel 22 is rotatable around its central axis 26 in a direction R1 to transfer the wafer boat assembly 1 between any of the boat assembly position 21, loading positions 27 and cool-down position 25. The first wafer boat part 3 is provided on a boat assembly position 21 and remains in said position during loading of wafers into the second wafer boat part 7 as will be explained more clearly later on. The second wafer boat part 7 is removably provided on said first wafer boat part 3.

The loading apparatus 20 further comprises a gripper arm 23 provided adjacent the boat assembly position 21 for displacing the second wafer boat part 7 with respect to the first wafer boat part 3, for instance in a direction R2. In the shown example in FIGS. 5 and 6, the gripper arm 23 comprises a gripper base 24 (see also FIGS. 1*a*, 2*a*, 3*a* and 4*a*) that is rotatable around its pivoting axis 28, that extends substantially parallel to the central axis 2 of the wafer boat assembly 1. The gripper arm 23 further comprises a gripper bearing element 29 that is adapted to engage with the second wafer boat part 7. The gripper bearing element 29 may be rotatably provided to the gripper arm 23, in direction R3, such that the inserting opening 11 of the second cover part 8 may be provided opposite a wafer handling device 30. The gripper arm 23 may further be configured to displace the second wafer boat part 7 in a direction R4 substantially axial to the central axis 2 of the wafer boat assembly 1 (see FIG. 2*a*).

The wafer handling device 30 may be configured to take semiconductor substrates out of a substrate supply 32 and to insert said substrates S into the second cover part 8 such that the receiving slots 10 hold the respective substrates S in a substantially horizontal orientation with a predetermined pitch.

Referring to FIGS. 5 and 6, the method for loading a vertical furnace as proposed will now be described.

By providing the loading apparatus 20 with a loading carousel 22 containing multiple positions, an increased throughput of processed semiconductor substrates S may be provided. In a boat assembly position 21 an individual wafer boat assembly 1 may be loaded with a plurality of semiconductor substrates S. The carousel 22 may then transfer the boat assembly 1 loaded with wafers to a loading position 27. The loaded wafer boat assemblies 1 may then be lifted into the process chamber (not shown) positioned above the respective loading position 27. After processing thereof, the wafer boat assembly 1 may be removed from the process chamber and return in its loading position. Subsequently, the loading carousel 22 may be rotated in a rotating direction R1 around the central axis 26 of said carousel 22 such that the wafer boat assembly is moved to a cool-down position 25. After cool-down, the boat may be transferred to the boat assembly position 21 for disassembly of the wafer boat assembly 1 and removal of the wafers from the boat assembly.

The loading of substrates S into a wafer boat assembly that is positioned in boat assembly position 21 will now be further elucidated. First, the gripper arm 23 that is provided adjacent the boat assembly position 21 may be moved towards the second wafer boat part 7 by rotating around the pivoting axis 28 of the gripper base 24 in a rotating direction R2. The gripper bearing element 29 may engage with the second boat part 7. The second boat part 7 is slightly lifted from the first boat part 3 in a direction R4 and displaced with respect to the first wafer boat part 3 in a direction R2 until the second boat part 7 is positioned adjacent the wafer handling device 30. The gripper bearing element 29 may additionally be rotated around its central axis 31 in direction R3 such that the inserting opening 11 of the second cover part 8 is provided opposite the handling device 30. Since the second cover part 8 of second boat part 7 is arc shaped defining said inserting opening 11 in between the longitudinal edges 12 of said cover part 8, the semiconductor substrates S may be inserted in the receiving slots 10 easily (see also FIGS. 1*a* and 1*b*). After loading the entire second wafer boat part 7, thus when all receiving slots 10 of the second cover part 8 are filled with a substrate S, the gripper arm 23 will displace the second cover part 8 towards the first wafer boat part 3 in reverse directions with respect to moving the second wafer boat part 7 towards the handling device 30. This step is clearly visible in FIGS. 2*a* and 2*b*. Once reaching the first wafer boat part 3, the second wafer boat part 7 is displaced in a substantially downward direction R4 (see FIG. 2*a*, 3*a*) such that the second wafer boat part 7 may be placed on the base 4. Subsequently, the second wafer boat part 7 and the first wafer boat part 3 are interconnected, or at least in mating position relative to each other (see FIGS. 4*a* and 4*b*). In the interconnected position as shown in FIG. 4*a*, both wafer cover parts 5, 8 extend substantially along the outer perimeter 6 of the base 4 and substantially surround an entire outer perimeter of the substrates S. The base 4 with the cover parts 5, 8 surrounding the loaded semiconductor substrates S may then be ready to be transferred to a loading position 27 and inserted in a processing chamber.

The wafer loading apparatus according to the example shown in FIGS. 5 and 6 may be used to advantage on an A412™ furnace as supplied by ASM International N.V. Almere, the Netherlands. Therefore, the invention further relates to a method to modify a known loading apparatus, for instance provided on an A412™ furnace, into a loading apparatus according to the invention. Such a method may comprise:

- adapting the gripper bearing element 29 to be able to engage the second boat part 7;
- adapting the gripper bearing element such that it is rotatable to bring the second boat part 7 in facing position with the wafer handling device 30 and in mating position with the first boat part 3.

Thus, the known gripper bearing element of a known loading apparatus may be replaced by an adapted gripper bearing element 29 such that is may cooperate with the second boat part instead of an entire boat stack including door plate. Instead, the configuration of the known gripper bearing element may be altered by means of replacing only parts of the known gripper bearing element to modify it to the gripper bearing element 29 according to the invention.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. It will be clear, for example, that the respective cover parts may have different dimensions, different kind of openings for use with different kinds of processes to be carried out inside the vertical furnace. Furthermore, the wafer boat assembly may be used with loading apparatuses with different configurations. Also the loading carousel may be configured differently. E.g. a loading apparatus without a loading carousel may be provided so that the boat assembly position is directly below a furnace and the boat assembly can be lifted directly from the boat assembly position into the furnace.

Besides, the gripper arm may have different configurations, as well as the handling device and the substrate supply.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combines in any suitable manner to form new, not explicitly described embodiments.

I claim:

1. A wafer boat assembly for use with a loading apparatus configured to load the wafer boat assembly with semiconductor substrates and to insert the loaded wafer boat assembly into a processing chamber of a vertical batch furnace, said wafer boat assembly comprising:

a first wafer boat part comprising a base and a first cover part mounted on said base; and a second wafer boat part comprising a second cover part that is provided with receiving slots for holding a plurality of semiconductor substrates in a vertically spaced apart relationship, wherein the second cover part has a substantially arc shape extending from a first longitudinal edge to a second longitudinal edge that together define an opening through which said substrates may be loaded into the receiving slots, and wherein the first and second wafer boat parts are detachably interconnectable, such that, in an interconnected condition, the first and second cover parts mate to one another and circumferentially extend around an entire outer circumferential perimeter of any substrate loaded in the wafer boat assembly, at a distance (d) therefrom.

2. The wafer boat assembly according to claim 1, wherein the respective cover parts are provided with openings to enable substantially uniform thin film deposition.

3. The wafer boat assembly according to claim 1, wherein the first and second cover parts, in use, are provided at a distance of 4-6 mm from an outer perimeter of the semiconductor substrates received in the wafer boat assembly.

4. A loading apparatus for loading semiconductor substrates into a vertical furnace configured for batch processing, the loading apparatus comprising:

the wafer boat assembly according to claim 1; and a loading carousel, defining:

a boat assembly position for assembling and disassembling the wafer boat assembly, and a boat loading position from which the wafer boat assembly is insertable into a process chamber of the vertical furnace, said loading carousel being rotatable to transfer the wafer boat assembly between the boat assembly position and the boat loading position.

5. The loading apparatus according to claim 4, wherein the first wafer boat part is provided on the boat assembly position.

6. The loading apparatus according to claim 5, wherein the second wafer boat part is removably coupled to the first wafer boat part, such that, in use, the second wafer boat part may be removed to allow loading of semiconductor substrates therein.

7. The loading apparatus according to claim 4, wherein adjacent the boat assembly position a gripper arm is provided to displace the second wafer boat part with respect to the first wafer boat part.

8. The loading apparatus according to claim 7, wherein the gripper arm is configured to displace the second wafer boat part towards and from a wafer handling device provided adjacent the loading position.

9. The loading apparatus according to claim 7, wherein the gripper arm comprises a gripper base and a gripper bearing element, wherein the gripper base is rotatable around its central axis.

10. The loading apparatus according to claim 9, wherein the gripper bearing element is pivotably connected to the gripper base such that in use an orientation of the second wafer boat part with respect to the first wafer boat part may be adjusted by rotation thereof.

11. The loading apparatus according to claim 7, wherein the gripper arm is configured to displace the second wafer boat part axially with respect to a central axis thereof.

12. The loading apparatus according to claim 4, wherein the first and second cover parts are provided with openings to enable substantially uniform thin film deposition.

13. A method for loading semiconductor substrates into a vertical furnace for batch processing said substrates, the method comprising:

providing a loading apparatus, wherein the loading apparatus comprises:

a wafer boat assembly comprising:

a first wafer boat part comprising a base and a first cover part mounted on said base; and a second wafer boat part comprising a second cover part that is provided with receiving slots for holding a plurality of semiconductor substrates in a vertically spaced apart relationship, wherein the second cover part has a substantially arc shape extending from a first longitudinal edge to a second longitudinal edge that together define an opening through which said substrates may be loaded into the receiving slots, and wherein the first and second wafer boat parts are detachably interconnectable, such that, in an interconnected condition, the first and second cover parts mate to one another and circumferentially extend around an entire outer circumferential perimeter of any substrate loaded in the wafer boat assembly, at a distance (d) therefrom; and a loading carousel, defining:

a boat assembly position for assembling and disassembling the wafer boat assembly, and a boat loading position from which the wafer boat assembly is insertable into a process chamber of the vertical furnace, said loading carousel being rotatable to transfer the wafer boat assembly between the boat assembly position and the boat loading position;

separating the second wafer boat part from the first wafer boat part provided on the boat assembly position;

displacing the second wafer boat part towards a wafer handling device adjacent the boat assembly position such that a wafer receiving opening of said second wafer boat part faces the wafer handling device;

loading at least one semiconductor substrate in the second wafer boat part such that the substrate is received in a receiving slot of the second cover part;

displacing the second wafer boat part towards the first wafer boat part;

mounting the second wafer boat part to the first wafer boat part; and inserting the wafer boat assembly loaded with at least one substrate into the vertical furnace.

14. The method according to claim 13, wherein the method comprises displacing the second wafer boat part with respect to the first wafer boat part along a substantially arc shaped trajectory.

15. The method according to claim 13, wherein the method comprises rotating the second wafer boat part around its central axis.

16. The method according to claim 13, wherein the method comprises transferring the wafer boat assembly loaded with substrates from the boat assembly position to the boat loading position and vertically lifting the boat assembly from the loading position into the vertical furnace.

* * * * *